United States Patent [19]

Duwel et al.

[11] 4,447,890

[45] May 8, 1984

[54] REMOTE POSTAGE METER SYSTEMS HAVING VARIABLE USER AUTHORIZATION CODE

[75] Inventors: Edward C. Duwel, Trumbull; Howell A. Jones, Jr., Fairfield, both of Conn.

[73] Assignee: Pitney Bowes Inc., Stamford, Conn.

[21] Appl. No.: 476,972

[22] Filed: Mar. 21, 1983

Related U.S. Application Data

[63] Continuation of Ser. No. 168,932, Jul. 14, 1980.

[51] Int. Cl.[3] .......... G06F 1/00

[52] U.S. Cl. .......... 364/900

[58] Field of Search .......... 364/900

[56] References Cited

U.S. PATENT DOCUMENTS

| | | | |
|---|---|---|---|
| 3,034,329 | 5/1962 | Pitney | 70/314 |
| 3,664,231 | 5/1972 | Hanson | 70/292 |
| 3,792,446 | 2/1974 | McFiggins | 364/900 |
| 3,798,359 | 3/1974 | Feistel | 178/22.06 |
| 3,798,360 | 3/1974 | Feistel | 178/22.05 |
| 3,798,605 | 3/1974 | Feistel | 364/200 |
| 3,800,284 | 3/1974 | Zucker | 340/825.31 |
| 3,978,457 | 8/1976 | Check, Jr. | 364/200 |
| 4,097,923 | 6/1978 | Eckert, Jr. | 364/900 |
| 4,138,735 | 2/1979 | Allocca | 364/900 |
| 4,253,158 | 2/1981 | McFiggans | 364/900 |
| 4,301,507 | 11/1981 | Soderberg | 364/704 |
| 4,310,720 | 1/1982 | Check, Jr. | 364/900 X |
| 4,314,097 | 2/1982 | Campbell, Jr. | 178/22.08 |

FOREIGN PATENT DOCUMENTS 2636852 2/1978 Fed. Rep. of Germany .

*Primary Examiner*—Raulfe B. Zache

*Attorney, Agent, or Firm*—David E. Pitchenik; William D. Soltow, Jr.; Albert W. Scribner

[57] ABSTRACT

A postage meter for use in a remote meter resetting system has data entered by a user of a selected, variable amount of postage in preparation for funding the postage meter with that amount. A unique combination is generated by the meter which varies as they function of signals generated within the postage meter and of the selected, variable postage amount entered into the postage meter. The meter also generates a unique user accessible authorization code which is employed by the user when communications are established with a remotely located data center. The unique authorization code is dependent upon the number of times the meter has been reset and on the other conditions within the meter. The data center computes and provides to the user a combination to be entered into the meter. The externally generated combination received from the data center is entered by a user into the postage meter. The meter generated combination and externally generated combinations are compared within the meter. When a comparison indicates the existence of a predetermined relationship, the postage meter is funded with the selected variable amount. Upon funding the meter, a new unique authorization code is generated for subsequently accessing the data center.

14 Claims, 4 Drawing Figures

REMOTE POSTAGE METER SYSTEMS HAVING VARIABLE USER AUTHORIZATION CODE

This application is a continuation of application Ser. No. 06/168,932, filed July 14, 1980.

FIELD OF THE INVENTION

The present invention relates to remotely recharging metering devices. More particularly, the invention relates to an improved remote variable recharging system suitable for use with postage meters.

BACKGROUND OF THE INVENTION

Postage meters are devices for dispensing value in the form of postage printed on a mail piece such as an envelope. The term postage meter also includes other similar meters such as parcel post meters. Meters of this type print and account for postage stored within the meter. Since representations of postage available for printing are stored in the meter, the postage meter must be provided with safeguards against tampering.

Within the above requirement, systems have been developed to enable postage meters to be recharged or reset with additional postage for printing by the meter without the need to physically carry the postage meter to the postal authorities for resetting. This avoids the inconvenience to the users of the postage metered mailing system by avoiding the necessity to bring the meters to the postal service for recharging. The remote recharging systems have met the requirement for security for the postage meters and have been developed for both fixed increment resetting for mechanical meters and variable increment resetting for electronic meters.

In the mechanical resetting meters, the system is equipped with a combination lock whose combination changes in a predetermined random sequence (often referred to as psuedo-random sequence) each time it is actuated. The combination lock operates on the resetting mechanism of the postage meter such that, when unlocked, the mechanism may be manipulated to recharge the meter with a postage increment. As the meter is recharged, the combination lock automatically locks itself to prevent subsequent recharging of the meter unless and until the correct new and different combination is entered. Combination locks of this type, suitable for use in postage meters are disclosed in U.S. Pat. Nos. 3,034,329 entitled Combination Lock Device and 3,664,231 entitled Locking Device.

The remote meter resetting system may also be incorporated in electronic postage meters such as described in U.S. Pat. No. 4,097,923 for REMOTE POSTAGE RECHARGING SYSTEM USING AN ADVANCED MICROCOMPUTERIZED POSTAGE METER. The resetting systems involve a data center which may be equipped with a voice answer back unit. The data center processes telephone calls from the postage meter users, requiring the transmission by the user of information unique to the particular meter being reset. The information is used to verify the authenticity of the caller and to update the record of the user stored at the data center.

The postage meter user informs the data center of the postage which is desired to be funded into the meter. The postage amount requested for resetting may be varied according to the requirement of the user. The computer at the data center formulates a combination based on the identifying information and the amount of postage requested for resetting. This combination is then transmitted back to the user. The user enters both the amount and the combination into the postage meter. The postage meter contains circuitry for comparing the entered combination with an internally generated combination based upon the amount of postage requested for resetting and the identifying information. If the entered combination matches the internally generated combination, the funding registers of the meter are increased by the new postage amount.

A system disclosed in copending U.S. patent application Ser. No. 024,813 filed Mar. 28, 1979, for Robert B. McFiggans and entitled SYSTEM FOR SECURING POSTAGE PRINTING TRANSACTIONS employs encryptors at both a printing station and an accounting station interconnected through an insecure communications link. Each time the meter is tripped, a number generator at the printing station is activated to generate a number signal which is encrypted to provide an unpredictable result. The number signal is also transmitted to the accounting station. At the accounting station, the postage to be printed is accounted for and the number signal is encrypted to provide a reply signal. The reply signal is transmitted to the printing station where a comparator compares it with the encryption results generated at the printing station. An equality of the encryption result and the reply signal indicates that the postage to be printed has been accounted for and the printer is activated.

Although the above systems operate quite satisfactorily for their intended purpose, it has been a constant desire to enhance the security of the postage meter remote recharging systems and to provide improved performance. This is particularly so with variable increment resetting which requires a more secure and more complex environment than fixed increment systems. The reasons for this are that the amounts which may be involved in a reset can be substantially larger than with fixed systems where the amount is established in advance.

The variable amount of the resetting make it more difficult to reconstruct previous information stored in the meter should that be needed. With fixed increment recharging the amount of the recharge is established in advance. Consequently, the change in the accounting registers in the meter can more easily be reconstructed. This is not the case for variable recharging.

For example, if the control sum in the postage meter's registers is employed in the recharging system, the user would communicate this information to the data center. The control sum is the sum of the postage meter descending register (which is the amount of the postage remaining to be printed) and the postage meter ascending register (which is the total of postage printed by the meter). This sum remains constant until the meter is recharged. At that time, the control sum increases by the amount of the reset. However, where the recharging amount is variable, the effect on the control sum change is not a defined progression for each recharge operation.

The problem is further complicated in those systems where user identification is accomplished by the utilization of information such as the control sum, the ascending register amount, the descending register amount, the meter serial number, the account number and other similar types of information. On such systems, many reset amounts can be requested by a user but not necessarily entered into the meter.

SUMMARY OF THE INVENTION

The present invention provides an improved remote meter recharging system having validation capability of the customer or user entered data. The invention inhibits a user from obtaining a series of reset amounts which are not entered into the meter and could cause the information stored at data center and the information stored in the meter to be inconsistent. Moreover, the present system enables a level of protection against inaccurate information either accidentally or intentionally entered by a user, as the system establishes valid conditions for a recharge based on whether or not the previous recharge has been successfully entered.

The present invention involves the use of means to provide enhanced protection by providing within the postage meter a means for generating a variable authorization code which is employed by the user when communications are established with a remotely located data center in the funding operation. The authorization code may be varied by the postage meter after each resetting.

A postage meter embodying the present invention includes means for entering a selected amount of postage into the meter in preparation for funding the postage meter with that amount. Means internally generate a unique combination which varies as a function of signals generated within the postage meter and of the selected postage amount entered into the postage meter. Means are provided for entering an externally generated combination into the postage meter. Means within the postage meter compare the internally generated and the externally generated combinations. Means fund the postage meter with the selected postage amount when the comparison indicates the existence of a predetermined relationship between the internally generated combination and the externally generated combination and means generate a new unique authorization code for accessing the next externally generated combination from a data center. The authorization code is displayable to the user on the postage meter display.

BRIEF DESCRIPTION OF THE DRAWINGS

A complete understanding of the present invention may be obtained by reference to the following detailed description and to the drawings, wherein like reference numerals are used to describe similar components in the various figures and in which.

DETAILED DESCRIPTION

Figure 1:
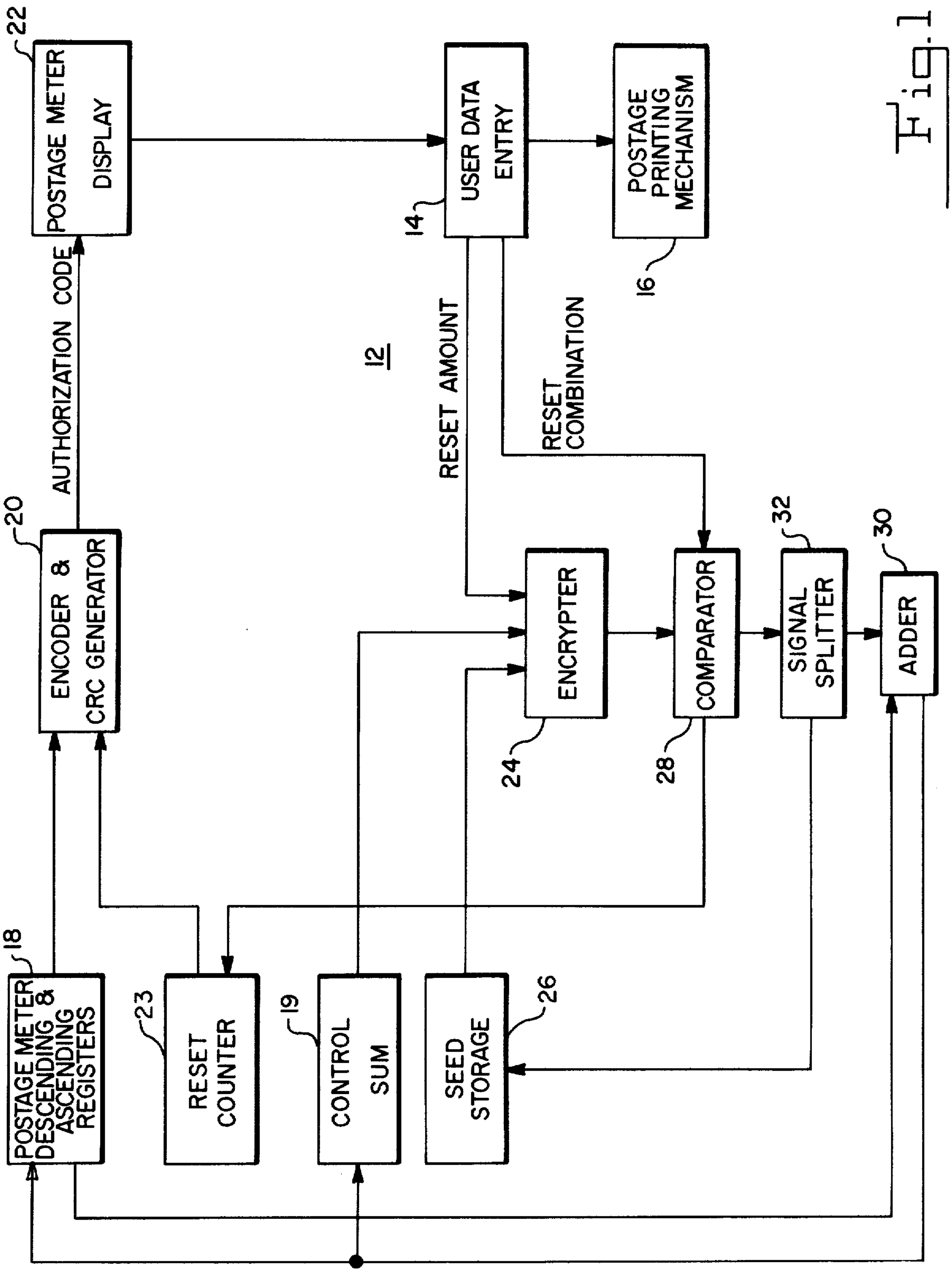
FIG. 1 is a block diagram of a postage meter embodying the present invention.

Reference is now made to FIG. 1. A postage meter 12 includes a user data entry means 14 such as a keyboard for entering postage to be printed by a postage printing mechanism 16. The postage meter 12 may be of the type disclosed in U.S. Pat. No. 3,978,457 entitled MICROCOMPUTERIZED ELECTRONIC POSTAGE METER or in copending U.S. patent application Ser. No. 89,413 filed Oct. 30, 1979 for ELECTRONIC POSTAGE METER HAVING PLURAL COMPUTING SYSTEMS. The postage meter 12 includes register 18 for accounting for postage stored in the meter and for other postage accounting information. Such information may include the total amount of postage printed by the meter (an ascending register), the total amount of postage remaining in the meter for printing (a descending register), and the sum of the ascending register and the descending register (a control sum register). The control sum register amount remains fixed for a postage meter unless and until the descending register is charged with additional postage.

Register 18 is coupled to an encoder and cyclical redundancy character generator 20 as is a reset counter 23. The encoder and cyclical redundancy character generator operates upon the information from register 18 and from the reset counter 23 to generate an authorization code. The authorization code may be displayed on the postage meter display 22. The authorization code is utilized in conjunction with the remote meter resetting of postage meter 12 in communications with a data center. The data center may be accessed by a postage meter user over an insecure communications link such as a telephone line.

The authorization code provides a level of assurance that the postage meter user calling the data center has physical access to the meter being reset and also that the information has been accurately transferred between the meter and the data center. The encoder and CRC generator 20 are of the type which process input information to provide a detection scheme for errors which may occur in transferring information.

When the postage meter 12 is to be recharged with postage, a reset amount is entered by the postage meter user at the data entry station 14. The reset amount is applied to an encrypter 24. Additionally, applied to the encrypter 24 is information from the control sum register 19, and a prestored seed number signal from seed storage 26. The seed number signal is stored in the meter 12 in an unencrypted form. Encrypter 24 can be any one of a large number of encrypting devices including those devices which use the Data Encryption Standards described in FIPS PUB 46, dated Jan. 15, 1977 and published by the U.S. Department of Commerce, National Bureau of Standards. Encrypter 24 generates an encrypted signal based upon the user entered reset amount, the information from the control sum register 19 and the seed number signal from seed storage register 26. Output signal from encrypter 24 is applied to a comparator 28. Comparator 28 compares the signal generated by the encrypter 24 with a user entered signal or combination.

If the comparator 28 determines that a user entered combination coincides with the combination generated by encrypter 24, the reset amount signal is applied, with the current descending register amount signal from register 18 to an adder 30. The reset amount is applied to increment the descending register and the control sum register.

Figure 2:
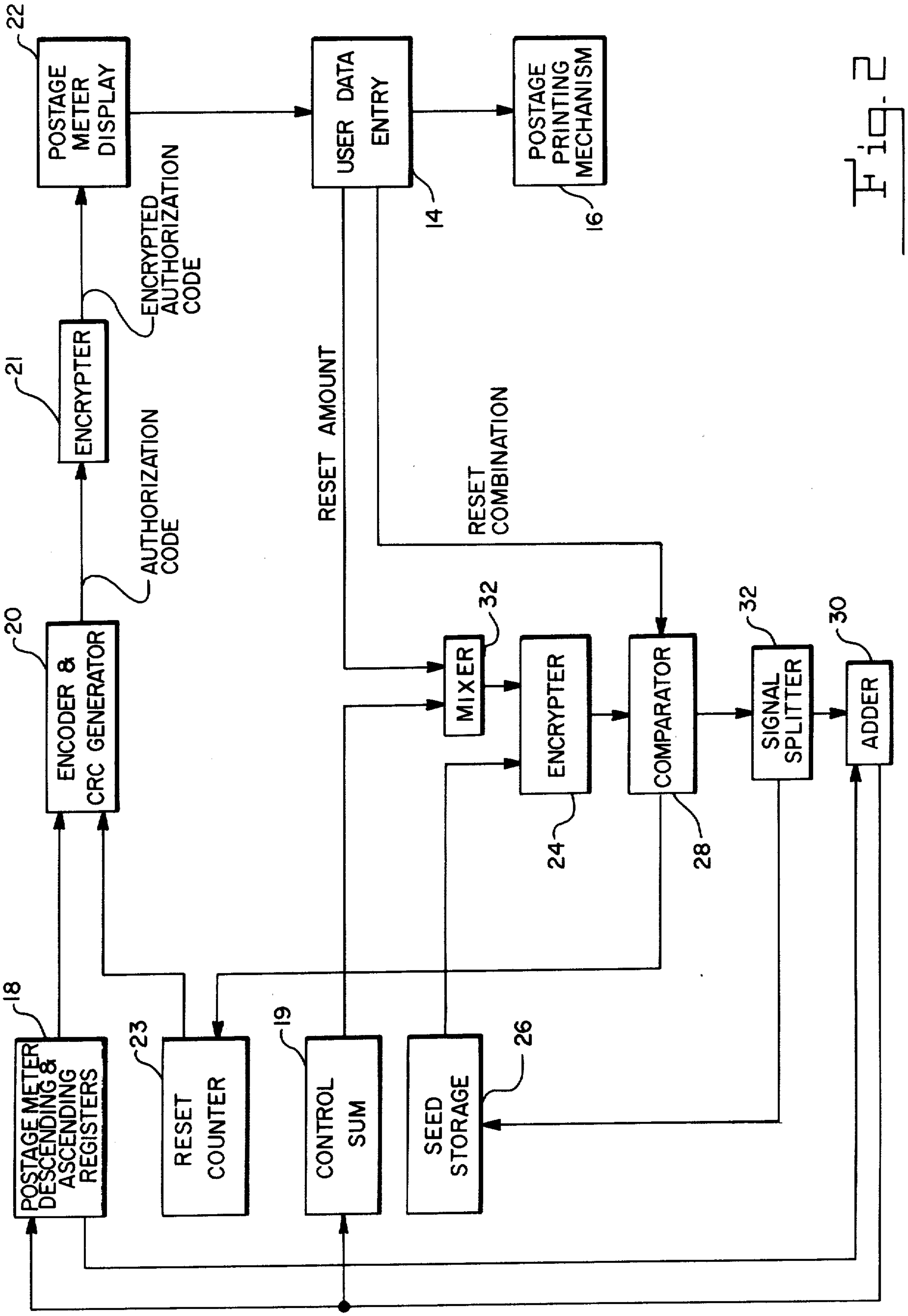
FIG. 2 is a block diagram of a postage meter in accordance with FIG. 1 including a second encrypter and mixer to enhance the security of the system.

It should be noted that in accordance with the embodiment shown in FIG. 2 the reset amount and the control sum may be first applied to a mixer circuit 32 before being applied to the encrypter 24. The mixer 32 provides additional security for the postage meter. The mixer provides a mixed input signal to the encrypter 24 such that the determination of the output signal from the encrypter 32 is more difficult to determine.

Referring again to FIG. 1, a successful comparison of a user entered combination and a combination generated in encrypter 24 results in a new clear text seed number signal being stored in the seed storage register 26 for the next reset activity.

Additionally, the reset counter 23 is incremented. The reset counter 23 may be one of many types including a modulo 2 or modulo 16 counter. The counter 23 provides an input signal to the encoder and CRC generator 20 such that the authorization code signal contains information as to whether the postage meter 12 has been successfully reset. The reset counter 23 is incremented by an output signal from the comparator 28 only when a successful comparison of the user entered reset combination signal and the internally meter generated reset combination signal occurs.

The output signal from the comparator 28 is applied to a signal splitter 32. The separator 32 extracts a new seed number signal from the generated cypher-text. The new seed number is stored in the seed register and the reset amount is applied to the adder 30.

Figure 3:
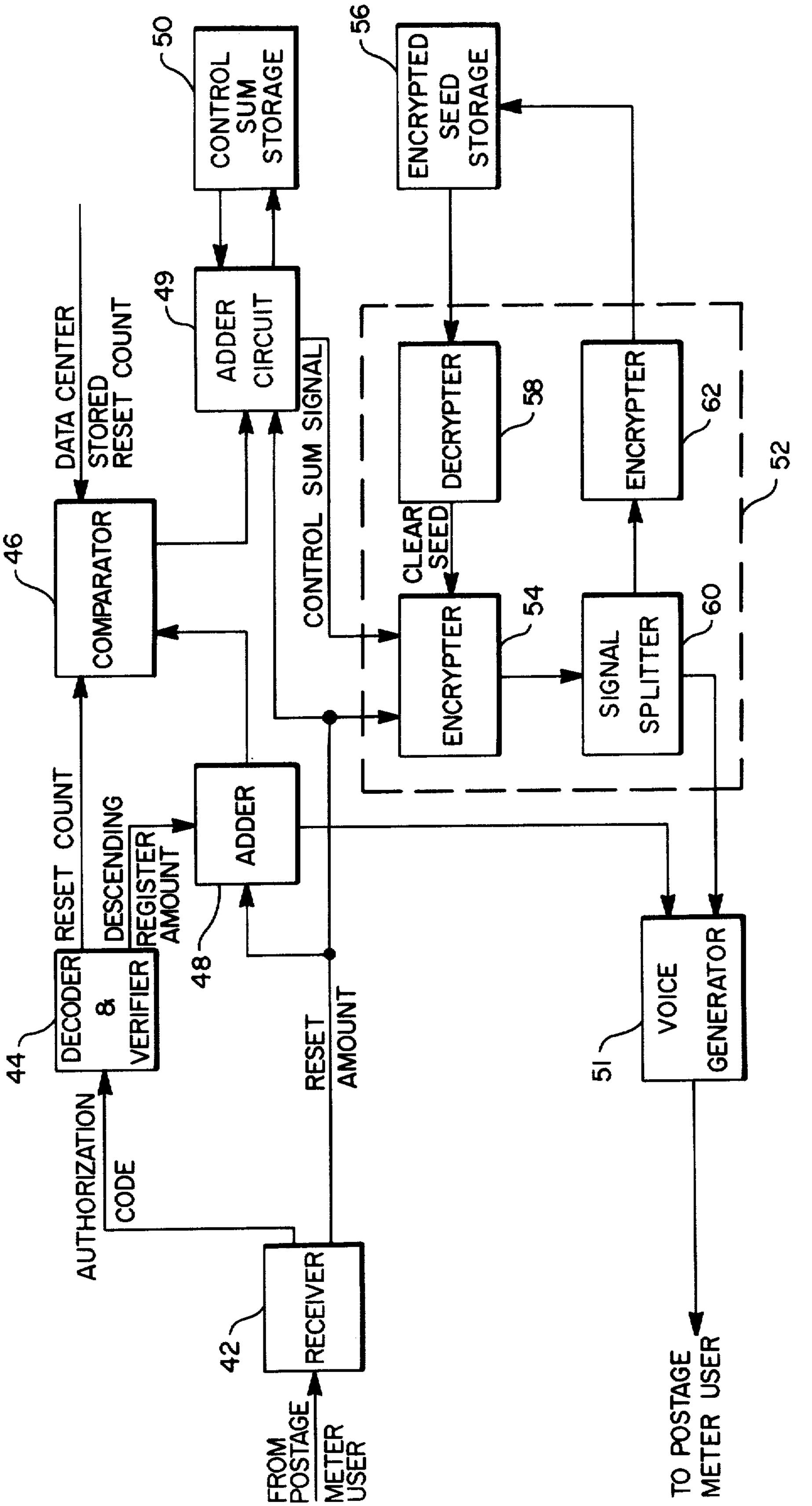
FIG. 3 is a block diagram of a data center suitable to be used in cooperation with the postage meter shown in FIG. 1.

Reference is now made to FIG. 3 which is a block diagram of a remote data center operable in conjunction with the remote settable meter 12 shown in FIG. 1. The data center 40 receives the authorization code generated by postage meter 12 and transmitted by the user such as by use of a tone generator type telephone. The authorization code is applied via a receiver 42 to a decoder and verifier 44.

The decoder and verifier 44 decodes the authorization code to generate the reset count and, for example, the descending register amount for postage meter 12. The decoder further verifies the CRC to insure that the data has been accurately transmitted and additionally to provide a level of verification that the user has had physical access to the meter being reset. This is because a user who determines the reset count and the descending register amount for a particular meter would not have sufficient information to access the data center, still needing to determine the signal processing in the encoder and CRC generator.

Figure 4:
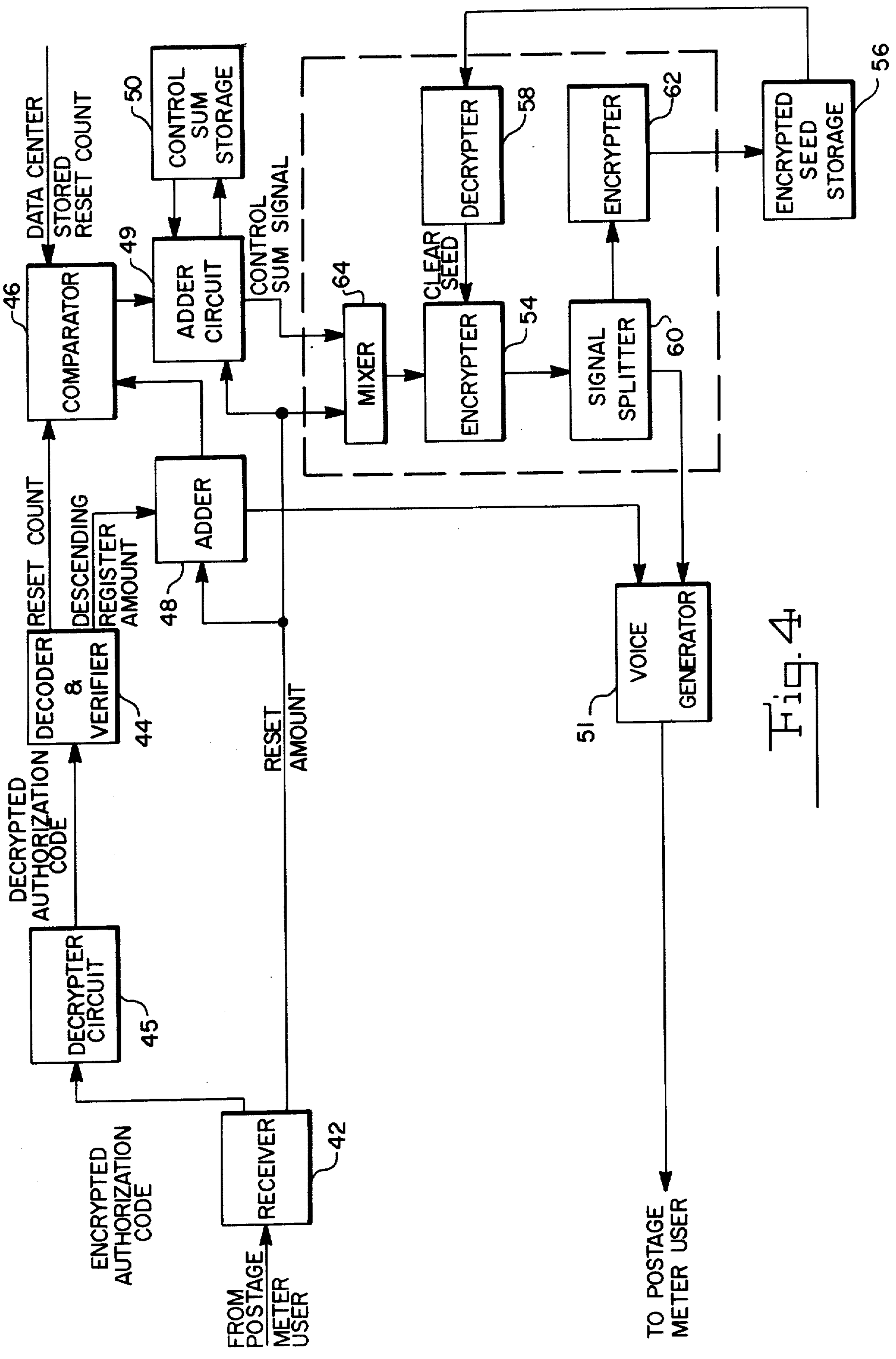
FIG. 4 is a block diagram of a data center suitable to be used in cooperation with the postage meter shown in FIG. 2.

It should be noted that further security can be provided by applying the authorization code to an encrypter 21 (FIG. 2) prior to display on the postage meter display 22 and thus, prior transmission by the postage meter user. If this occurs, the encrypted authorization code, as is shown in FIG. 4, would be decrypted in a decryption circuit 45.

Referring again to FIG. 3, if the decoder and verifier 44 verifies the accuracy of the transmission (the CRC is correct), the reset count signal is generated and applied to a comparator 46 wherein the decoded reset count signal is compared to the reset count signal stored at the data center. The decoded descending register amount signal is applied to an adder 48 with the reset amount signal from receiver 42 which is also provided to the data center by the user. If the sum of the descending register and reset amount exceeds the amount of postage capable of being stored in the postage meter, the reset operation is inhibited. This information may be communicated back to the user via a voice generating means 51.

If the stored reset count signal and the decoded reset count signal compare correctly, the comparator 46 enables an adder circuit 49 coupled to the control sum storage register 50 to provide the current control sum associated with postage meter 12 to a physically sealed unit 52 and to add the reset amount to the control sum storage register. The physically sealed unit 52 is sealed in a manner to prevent access to the circuitry by data center personnel. The sealed unit, which will be described in greater detail hereinafter, results in an enhanced security for the remote meter resetting system because the data center personnel do not have access to the encryption circuit and certain unencrypted data associated with the resetting of the meter 12.

The control sum register 50 signal is applied to an encrypter 54 within sealed unit 52 as is the user entered reset amount signal from receiver 42. Additionally applied to the encrypter 54 are unencrypted seed number signals. The encrypter 54 may be any one of a large number of encrypting devices such as those employing the data encryption standard previously identified. However, it should be noted that encryption device 54 is identical in its operation to the encryption device 24 in postage meter 12.

The seed number signal applied to the encrypter 54 is stored in the data center so that it may be accessible by data center personnel. However, the seed number signal is stored in an encrypted form in encrypted seed storage 56. This is the only form of the seed signal to which data center personnel have access. The encrypted seed signal from storage 56 is applied to a decryption device 58 which need not be similar to or compatible with the form of encryption provided by encrypter 54 and encrypter 24 in the postage meter 12. The decryption device 58 which again may be any one of the large number of devices functions to decrypt the encrypted seed number signal and to provide an unencrypted, clear seed number signal which is the same as the seed number signal stored in the seed storage 26 postage meter 12. The encrypter 54 generates an encrypted output signal which is applied to a signal splitter circuit 60. The splitter circuit 60 splits the encrypted output signal from encrypter 54 into a first part which is transmitted via the voice generator means 51 to the postage meter user. The voice transmitted combination is the combination which is entered by the user and applied to the comparator 28 in FIG. 1.

The splitter circuit 60 additionally applies part of the encrypted output signal from encrypter 54 to a second encryptor 62 to generate a new encrypted seed number signal. Encrypter 62 encrypts the seed number signal in a manner so that it is compatible with the decryptor 58. The new encrypted seed number signal for postage meter 12 is transmitted from within the sealed unit 52 to the encrypted seed storage 56 which is accessible to the data center personnel.

Reference is now made to FIG. 4 which shows the use of a mixer 64 located within the sealed unit 52. In this embodiment, the mixer 64 provides a further enhanced security, similar to mixer 30 provided in postage meter 12. If a mixer 30 is provided in the postage meter 12, a like mixer 64 must be provided at the data center.

What is claimed is:

1. A postage meter of the type having printing means for printing postage, and register means for accounting for postage, said register means of the type adapted to be funded with additional postage, and data entry means for entering data into said meter of a selected, variable amount of postage in preparation for funding said register means with that amount and of an externally generated combinations, the improvement comprising:

Means for generating a unique combination which varies as a function of said selected, variable postage amount entered by said data entry means;

Means coupled to said combination generating means and said data entry means for comparing combinations generated by said combination generating means and externally generated combinations entered by said data entry means, to determine if a predetermined relationship exists between said combination generated by said combination generating means and said externally generated combination entered by said data entry means;

Means coupled to said comparing means for funding said register means with said selected, variable postage amount when said comparing means indicates the existence of said predetermined relationship between said combination generated by said combination generating means and said externally generated combination entered by said data entry means; and Means coupled to said comparing means for generating an authorization code, each authorization code generated by said authorization code generating means being a function of the number of times said register means have been funded with additional postage.

2. A postage meter as defined in claim 1 wherein said authorization code means includes an encoder and CRC generator.

3. A postage meter of the type having printing means for printing postage and register means for accounting for postage, said register means adapted to be funded with additional postage, and data entry means for entering data into said meter of selected, variable amount of postage in preparation for funding said register means with that amount and of an externally generated combinations, the improvement comprising:

Encrypter means coupled to said data entry means;

Means for storing signals, said signal storing means coupled to said encrypter means for entering signals stored in said signal storing means into said encrypter means;

Comparator means coupled to said encrypter means and to said data entry means for comparing output signals from said encrypter means and signals entered by said data entry means;

Splitter means coupled to said comparator means for separating the output signal from said comparator means into a first part and into a second part, said splitter means coupled to said signal storing means for updating signals stored in said signal storing means with said first part of said comparator means output signal;

Adder means coupled to said splitter means and to said register means for adding said second part of said comparator means output signal and the contents of said register means to provide a new signal for storage in said register means; and Means coupled to said register means for generating an authorization code.

4. A postage meter as defined in claim 3 wherein said stored signal includes a control sum signal and a seed number signal.

5. A postage meter as defined in claim 3 further including a reset counter said reset counter having reset information stored therein, said reset counter coupled to said authorization code generating means such that said authorization code generated by said authorization code generating means is a function of said reset information stored in said reset counter.

6. A postage meter as defined in claim 3 further including display means coupled to said authorization code generating means and to said data entry means, said data entry means including means for causing said authorization code to be displayed on said display means.

7. A postage meter as defined in claim 3 further including a second encrypter means coupled to said authorization code generating means for encrypting said authorization code.

8. A postage meter as defined in claim 3 further including mixer means, and wherein said data entry means is coupled to said encrypter by said mixer means, and said mixer means is further coupled to said signal storing means, said mixer means mixing signals entered by said data entry means and signals stored in said signal storing means.

9. A postage meter of the type having a printing means for printing postage and register means for accounting for postage, said register means adopted to be charged with additional postage, data entry means for entering data into said postage meter and display means for displaying data stored in said postage meter, the improvement comprising:

Encrypter means coupled to said data entry means;

Seed number signal storage means for storing seed number signals, said seed number storage means coupled to said encrypter means;

Control sum signal storage means coupled to said encrypter means;

Comparator means coupled to said encrypter means and to said data entry means for comparing output signals from said encrypter means and signals entered by said data entry means to determine if a predetermined relationship exists between said encrypter means output signal and said signal entered by said data entry means;

Splitter means coupled to said comparator means for separating the output signals from said comparator means into a first part and into a second part, said splitter means coupled to said seed number signal storage means for updating said seed number signal stored in said seed number signal storage means with said first part of said output signal from said comparator means;

Adder means coupled to said splitter means and to said accounting register means for adding said second part of said output signal from said comparator means to data in said accounting register means;

Reset counter means coupled to said comparator means, said reset counter means maintaining a count of the number of times said comparator determines the existence of a predetermined relationship between the output signal from said encrypter means and signals entered from said data entry means; and Means coupled to said register means, said reset counter means and to said display means for generating an authorization code which is displayable by said display means, said authorization code generated by said authorization code generating means being a function of the count maintained by said reset count means and of data in said register means.

10. A postage meter of the type having printing means for printing postage and register means for accounting for postage printed by said printing means, said register means adapted to be charged with additional postage, and data entry means for entering data into said meter in preparation for charging said register means with additional amounts of postage and of an externally generated combination, the improvement comprising: means coupled to said data entry means for processing signal information stored within said meter, said signal processing means processing said signal information to generate a unique authorization code which is a function of said signal information, said processing means generating a different unique authorization code upon the funding of said postage meter register with said additional postage.

11. A postage meter is defined in claim 10 where said processing means include an encoder and cyclic redundancy check code generator.

12. A postage meter as defined in claim 10 further including a reset counter and wherein said reset counter and said postage meter register means are coupled to said processing means, said reset counter and said register means providing said signal information for processing by said processing means to generate said authorization code.

13. A postage meter is defined in claim 12 wherein said processing means includes an encoder and cyclic redundancy check code generator.

14. A postage meter as defined in claim 13 including a display means, said display means coupled to said processing means and operable to display said authorization code.

* * * * *